(12) United States Patent
On et al.

(10) Patent No.: US 6,275,956 B1
(45) Date of Patent: Aug. 14, 2001

(54) INTEGRATED DYNAMIC-VISUAL PARALLEL DEBUGGING APPARATUS AND METHOD THEREOF

(75) Inventors: Gi Won On; Bum Sik Lee; Dong Hae Chi; Chee Hang Park, all of Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 09/131,334

(22) Filed: Aug. 7, 1998

(30) Foreign Application Priority Data

Oct. 28, 1997 (KR) .................................................. 97-55643

(51) Int. Cl.[7] ....................................................... G06F 11/00
(52) U.S. Cl. .................................................. 714/38; 717/4
(58) Field of Search .................................. 714/33, 34, 38, 714/45, 57; 717/4

(56) References Cited

U.S. PATENT DOCUMENTS

| | | |
|---|---|---|
| 5,021,948 | 6/1991 | Nakayama et al. . |
| 5,210,859 | 5/1993 | Aoshima et all . |
| 5,361,352 * | 11/1994 | Iwasawa ..................................... 717/4 |
| 5,375,125 | 12/1994 | Oshima et al. . |
| 5,426,648 * | 6/1995 | Simamiura .............................. 714/38 |
| 5,581,696 * | 12/1996 | Kolawa .................................. 714/38 |
| 5,655,073 * | 8/1997 | Nishikado .............................. 714/38 |
| 5,687,375 * | 11/1997 | Scwiegelshohn ........................ 717/4 |
| 6,021,272 * | 2/2000 | Cahill ..................................... 717/5 |
| 6,161,216 * | 12/2000 | Shagam .................................. 717/4 |
| 6,195,676 * | 2/2001 | Spix ..................................... 709/107 |
| 6,202,173 * | 3/2001 | Hollett .................................. 714/38 |

* cited by examiner

*Primary Examiner*—Robert Beausoleil
*Assistant Examiner*—Bryce P. Bonzo
(74) *Attorney, Agent, or Firm*—Antonelli, Terry, Stout & Kraus, LLP

(57) ABSTRACT

An integrated dynamic-visual parallel debugging apparatus comprising: replay drive means for receiving a program and creating program symbol table information and an execution log file through reference execution; a parallel debugger core for receiving the program symbol table information and the execution log file from the replay drive means and managing views and events; and graphical user interface means for interfacing the parallel debugger core and a user.

15 Claims, 6 Drawing Sheets

INTEGRATED DYNAMIC-VISUAL PARALLEL DEBUGGING APPARATUS AND METHOD THEREOF

BACKGROUND OF THE INVENTION

1. Field of the Invention

The present invention relates to an integrated dynamic-visual parallel debugging apparatus and method thereof for a debugging parallel program carried out in a high speed parallel computer (called SPAX hereinafter).

2. Description of the Prior Art

There are static debugging and dynamic debugging in conventional program debugging technology of program developing environment, particularly, in a parallel program debugging field. Specifically, in the dynamic debugging, cyclical debugging has been used representatively. This cyclical debugging is properly applicable to debugging of a sequential program having a single deterministic route for the program execution, but it has limitation in application to the debugging of the parallel program where the single execution route is not deterministic.

SUMMARY OF THE INVENTION

Accordingly, the present invention is directed to an integrated dynamic-visual parallel debugging apparatus and method thereof that substantially obviates one or more of the limitations and disadvantages of the related art.

An object of the present invention is to provide an integrated dynamic-visual parallel debugging apparatus and method for offering concentrated error debugging function with respect to an access to a shared memory between threads and message-passing interface (MPI) communication between processes where error occurrence is predicted, by providing a dynamic cyclical debugging function based upon the guarantee of an execution route, displaying a result of debugging in the form of a text, showing an execution flow of a program being debugged with a visual view, and automatically performing view mapping with respect to an execution point where error occurrence is predicted in a parallel program, while the debugging of the parallel program is performed at an SPAX.

For the accurate debugging of the parallel program within a minimum time, replaying of the execution route where errors occurred should be guaranteed and the result of the debugging with respect to the point where the error occurrence is predicted, such as the communication between processes (threads) or the access to a shared memory, should be analyzed and displayed in the various forms of visual views. Technologically speaking, the execution of the program to be debugged should be recorded in the form of a log file, and, on the basis of the log file should be simultaneously performed both replay of the overall program and graphical view display of each debugging point. To achieve those things, a debugger should automatically map textual values, such as program variables and communication functions, into each corresponding point in a graphical view which is visually displayed on a screen during the dynamic debugging.

Accordingly, the object of the present invention is to build integrated dynamic-visual debugging environment where the result of debugging displayed as textual and graphical views is exactly searched on the basis of the execution log file and mapped into the graphical view, thereby simultaneously achieving both dynamic and visual debugging.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, an integrated dynamic-visual parallel debugging apparatus includes: a replay drive means for receiving a program and creating program symbol table information and an execution log file through reference execution; a parallel debugger core for receiving the program symbol table information and the execution log file from the replay drive means and managing views and events; and a graphical user interface means for interfacing the parallel debugger core and a user. The replay drive means receives a multithreaded program or an message-passing interface (MPI) program, uses an event capture library to define an event to be captured, and calls out and runs a thread replay module or an MPI replay module according to the program received. The replay drive means also uses a replay library to make an original program follow an execution order identical to reference execution by referring the execution log file created during the reference execution. The parallel debugger core includes: a view manager for managing a window through which a result of debugging is displayed; a controller for controlling execution of a program to be debugged; and an event manager for managing debugging events. The graphical user interface means includes: a source text view browser for displaying a result of debugging in a textual view pattern and providing a dialog and menu for supporting debugging events and control functions and a function of calling back functions corresponding to the menu and dialog; a graphical view browser for supporting graphical views showing execution of a program being debugged and having control functions necessary for view animation; and a textual/graphical view mapper having a function of mapping events displayed in textual and graphical patterns.

In another aspect, the present invention provides an integrated dynamic-visual parallel debugging method including the steps of: entering information for visual debugging while performing dynamic cyclical debugging on a textual view window and requesting textual/graphical mapping; notifying a result of searching an execution log file to find out a mapping object event to a graphical view browser and a dialog of which have been requested mapping; displaying flow of execution of a program being debugged; performing the visual debugging by repeatedly animating the execution flow of the program which is currently displayed; examining an execution state at a point where the program stops because of a debugging event on various textual view windows regardless of progress of the visual debugging; and requesting textual/graphical view mapping in synchronization with the examining step above. All the steps are repeatedly performed until a user terminates operation of a parallel debugger or finds an error. The mapping object event in a textual/graphical view mapping dialog, a unique number of a process or a thread which executes the mapping object event, a total number of times that the mapping object event is executed before reaching an end point of the mapping, and a desired graphical view are entered at the step of requesting the textual/graphical mapping. The step of displaying the execution flow includes steps of: initializing the graphical view browser according to notification of a fact that the mapping object event exists in the execution log file; reading out of the execution log file before reaching a point where the mapping object event is located; and displaying the execution flow of the program being debugged on a selected graphical view window. The visual debugging step is performed independently of the dynamic debugging and uses a view control function. At the visual debugging step, the execution flow of the program is read out of the execution log file consecutively from a point where the mapping object event is located and animated. The dynamic cyclical debugging is repeated on the textual view window displayed on a screen at the step of the examining the execution state.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

With reference to the accompanying drawings, one of the preferred embodiments of the present invention will now be described in detail.

Figure 1:
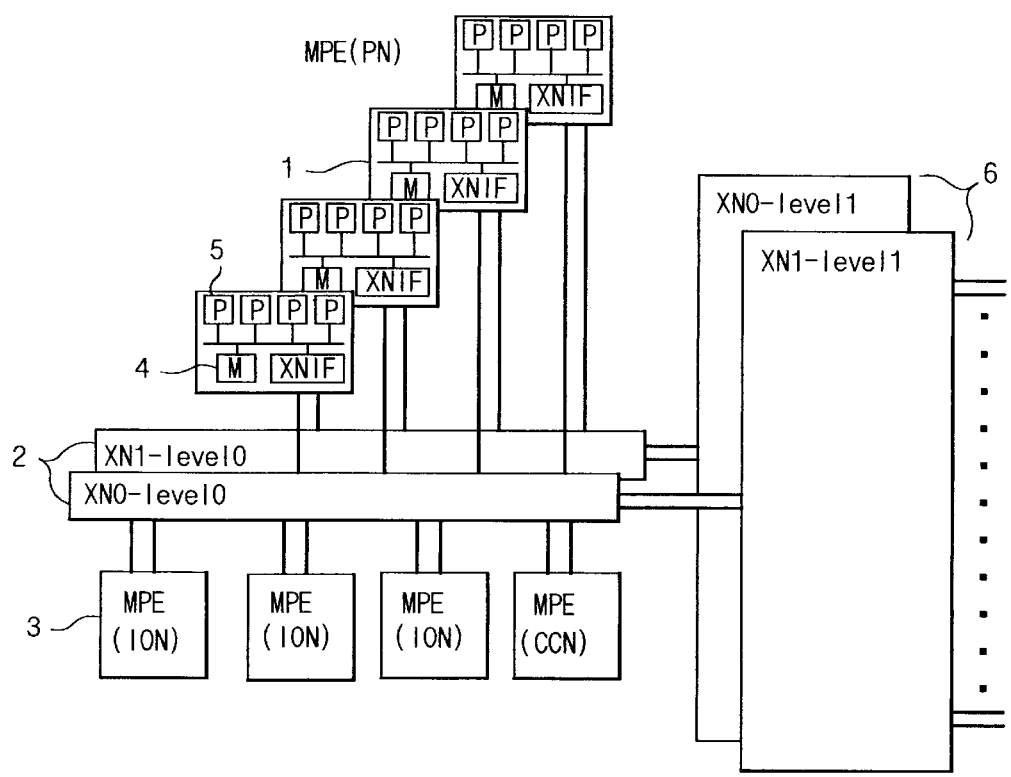
FIG. 1 shows a configuration of hardware of a high speed parallel computer where the present invention is applied.

FIG. 1 shows a configuration of hardware of an SPAX which the present invention is applied to. According to FIG. 1, the configuration of the hardware of the SPAX employing a parallel debugger and its debugging method in accordance with the present invention is described below.

The SPAX is a cluster parallel computer where each processing node 1 having a symmetric multi-processor (SMP) structure includes four processing units 5 and a uniform memory access (UMA) shared memory model 4. Each cluster comprises four processing nodes, and noremote memory access (NORMA) memory models are provided between the nodes and between the clusters. Layer crossbar networks 2 and 6 are provided for communications between the nodes and between the clusters, and input/output nodes 3 are connected thereto.

Figure 2:
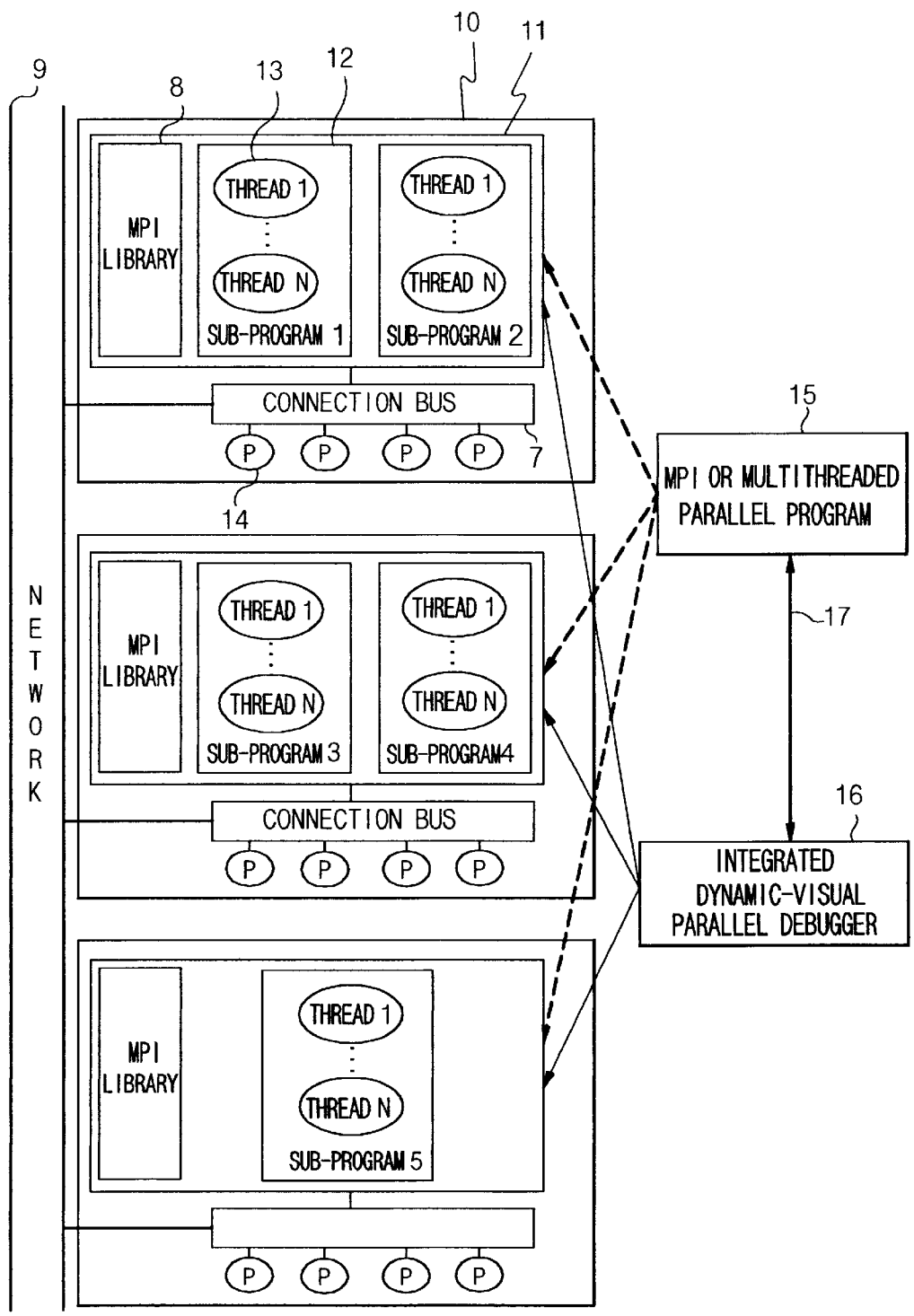
FIG. 2 shows interface among a high speed parallel computer, a parallel program, and an integrated parallel debugger.

Referring to FIG. 2, the interface among the SPAX, the parallel program, and the integrated parallel debugger will now be described.

The SPAX includes distributed memories 11 and nodes 10 which are connected each other through a high speed network 9 and is provided with message-passing libraries 8 for supporting the communication between processes 14 or threads 13. The parallel program 15 is distributed to the multiple nodes and executed in parallel by process and thread managers and scheduler provided by the system. At each node is executed at least one sub-program 12 and each node processing unit 14 executes the sub-programs assigned thereto through the scheduler by the units of the process and thread. Each sub-program comprises one or more processes. For a multithreaded program, one process includes a plurality of threads which communicate with each other through sharing of the memory of the process. The parallel debugger 16 having control 17 over the parallel program distributively carried out performs an error debugging task with respect to all the processes and threads associated in the execution of the program. Detailed debugging procedure of the parallel debugger is illustrated in FIG. 4.

Figure 3:
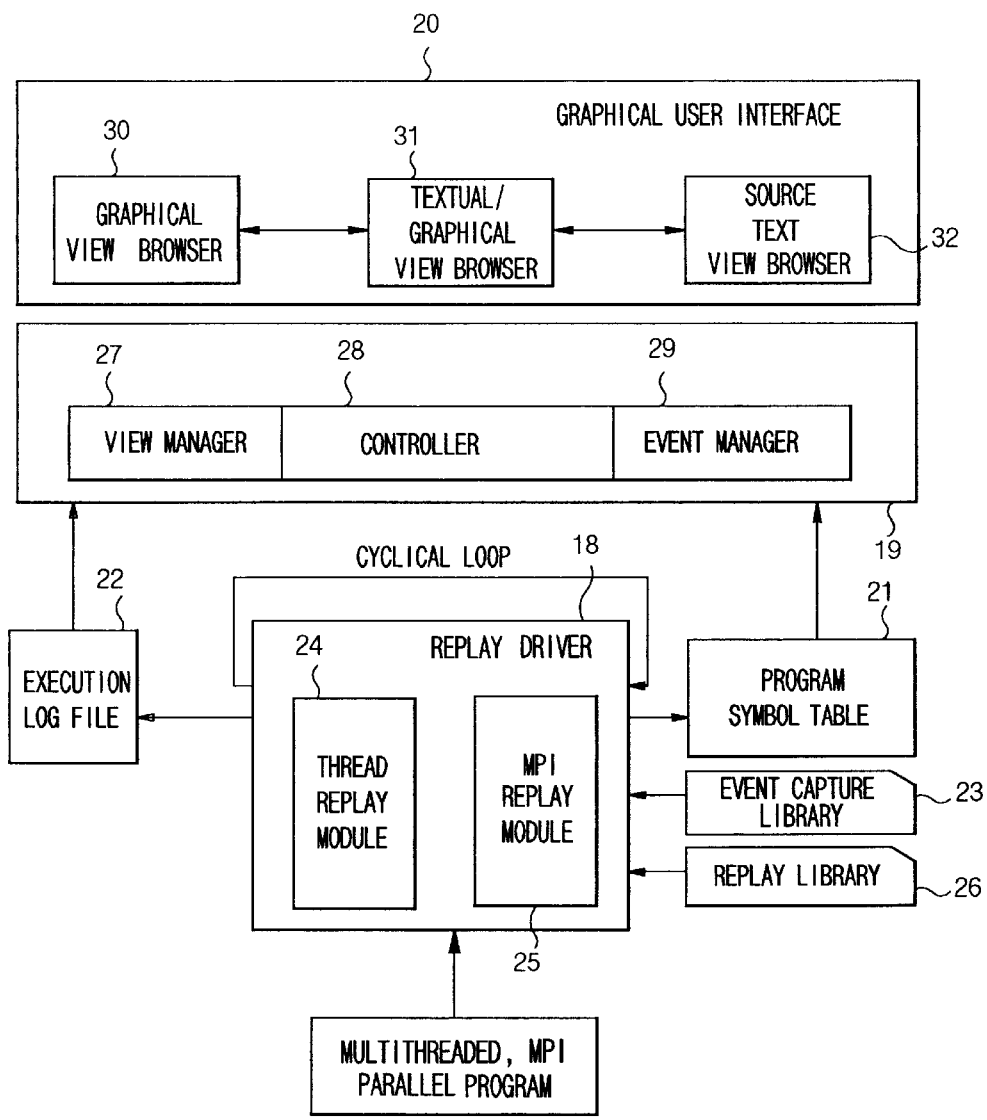
FIG. 3 shows a configuration of an integrated dynamic-visual parallel debugger.

The following description referring to FIG. 3 concerns the configuration of the integrated dynamic-visual parallel debugger.

The integrated dynamic-visual parallel debugger comprises a replay driver 18, a debugger core 19, and a graphical user interface 20 in large. The replay driver 18 receives the multithreaded program or MPI program and creates program symbol table information 21 and execution log file 22 through reference execution. The reference execution is necessary for simplifying an execution route of the program. For this reference execution, that is, for definition of an event to be traced, an event capture library 23 is used, and, according to an input program, a thread replay module 24 or an MPI replay module 25 is called out for execution. The replay of the program is implemented by following the same order of the execution as that of the reference execution through reference of the execution log file created from the reference execution of the original program. For this operation of the replay, a replay library 26 is used. The parallel debugger core includes a view manager 27, a controller 28, and an event manager 29. The view manager is provided with managing functions (ex. construction of a window frame, menu, and sub-window, register of menu buttons) with respect to the window displaying the result of debugging. The controller is provided with functions (ex. run, stop, step) of controlling the execution of the program to be debugged. The event manager is provided with functions of managing debugging events (ex. breakpoint, watchpoint, stop on function). The graphical user interface comprises a source text view browser 32, a graphical view browser 30, and a textual/graphical view mapper 31. The source text view browser displays the result of debugging in a textual view pattern and provides a dialog and menu for supporting the debugging events and control functions and a function of calling back functions corresponding to the menu and dialog. The graphical view browser supports graphical views, such as a thread execution view and an MPI communication view, showing the execution of the program being debugged and is provided with control functions (ex. stop, pause, run, reset) necessary for view animation. The textual/graphical view mapper is provided with a function of mapping events (constructs: creation of a thread, end of a thread, callback of a function, MPI transmission/reception) displayed in the textual and graphical patterns.

Figure 4:
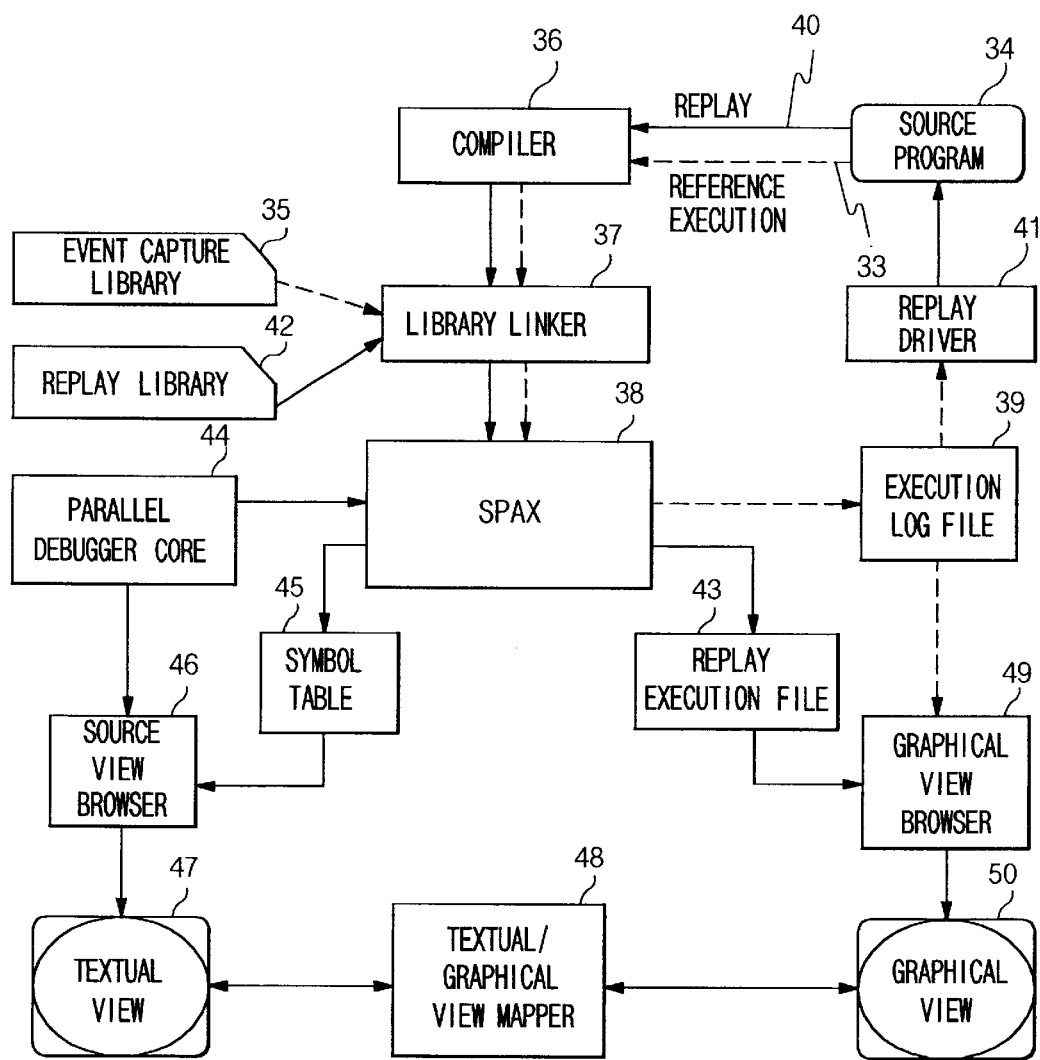
FIG. 4 shows flow of integrated dynamic-visual parallel debugging.

The following description referring to the flow chart of the integrated dynamic-visual parallel debugging depicted in FIG. 4 concerns the processes of debugging the multi-threaded program or parallel program constructed using the MPI library and elements of the debugger used for each process.

The program debugging using the integrated dynamic-visual parallel debugger comprises two steps. A first step is a reference execution step 33. Primarily, a necessary routine for capture is applied to an event to be captured in a debugged object source program 34. This routine is offered by the event capture library 35. The modified program has a history file for recording the trace of execution through a compiler 36 and library linker 37. The file is executed on the SPAX 38 to create an execution log file 39. A second step is a replay step 40. The routine referring to the execution log file is applied to the event which was an object of the capture in the debugged object source program. This is compiled under the control of the replay driver 41 and the library linker is executed for link of a replay library 42, thereby creating a replay execution file 43. The dynamic debugging by the parallel debugger is implemented by examining the states of processes, values of variables, and register values at a symbol table 45 while executing the replay execution file at the SPAX under the control of the parallel debugger core 44. The result of the dynamic debugging is displayed on a textual view window 47 through the source view browser 46. The dynamic cyclical debugging is performed through cyclical use of steps of setting a breakpoint or watchpoint, executing the program, and examining symbol values on the window. During the dynamic debugging, the textual/graphical view mapper 48 operates with respect to the constructs which are the points where error occurrence is predicted. For this operation, a textual/graphical view mapping dialog is called to the source view window which is one of the textual view windows. After setting a mapping object event, a number of a process running the event (a thread number in case of the threaded program), the number of times of calling out the event, and a desired graphical view, a user keys a mapping start button to carry out the mapping. If the mapping object event exists in the execution log file, the graphical view browser 49 graphically displays the execution of the program till the point where the current mapping event exists on the selected graphical view 50. So, the user can animate the execution of the program on the graphical view or continue the dynamic debugging on the textual view window.

Figure 5A:
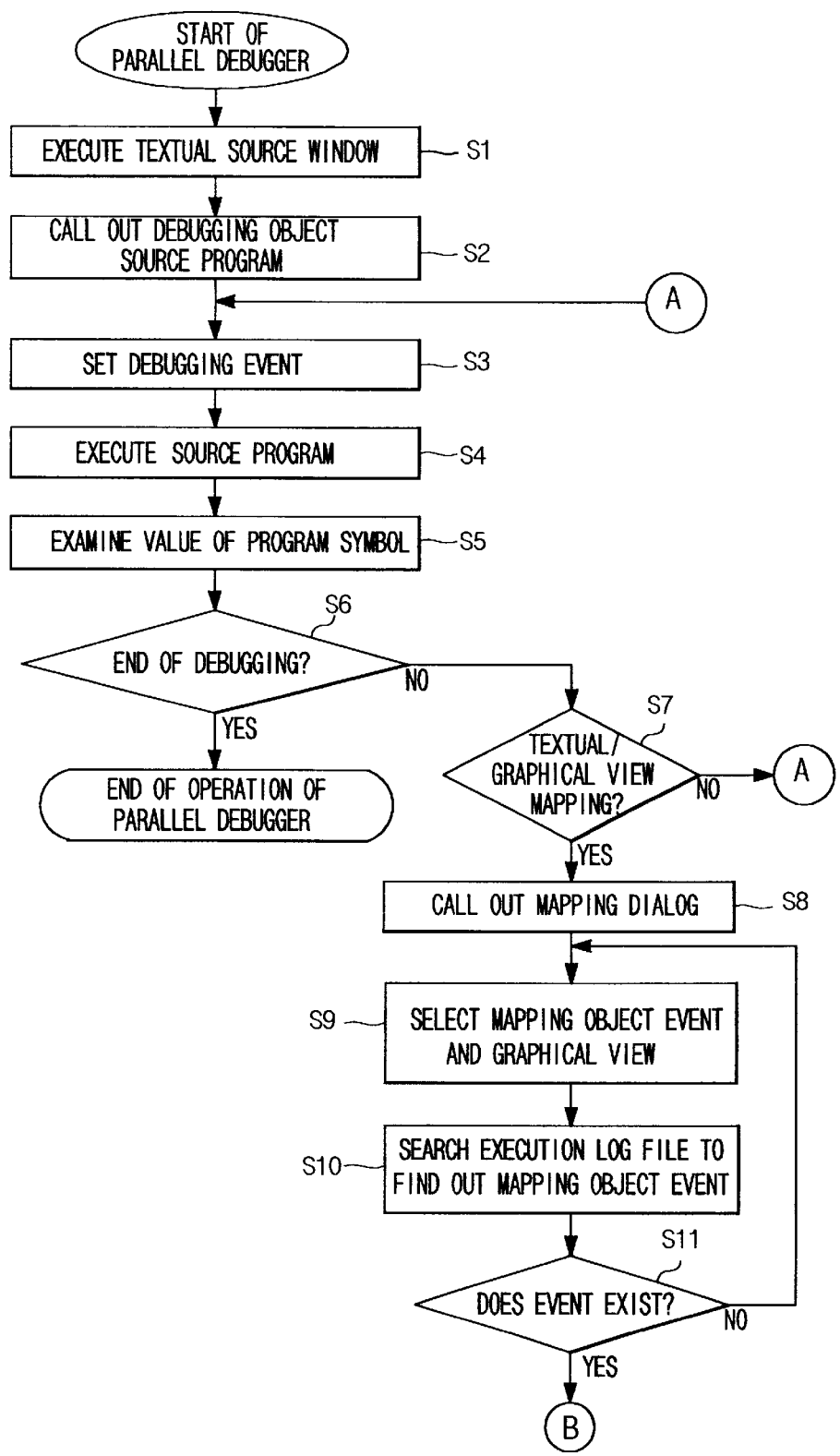
FIGS. 5a and 5b are flow charts showing the operation of an integrated dynamic-visual parallel debugger and textual/graphical view mapper.
Figure 5B:
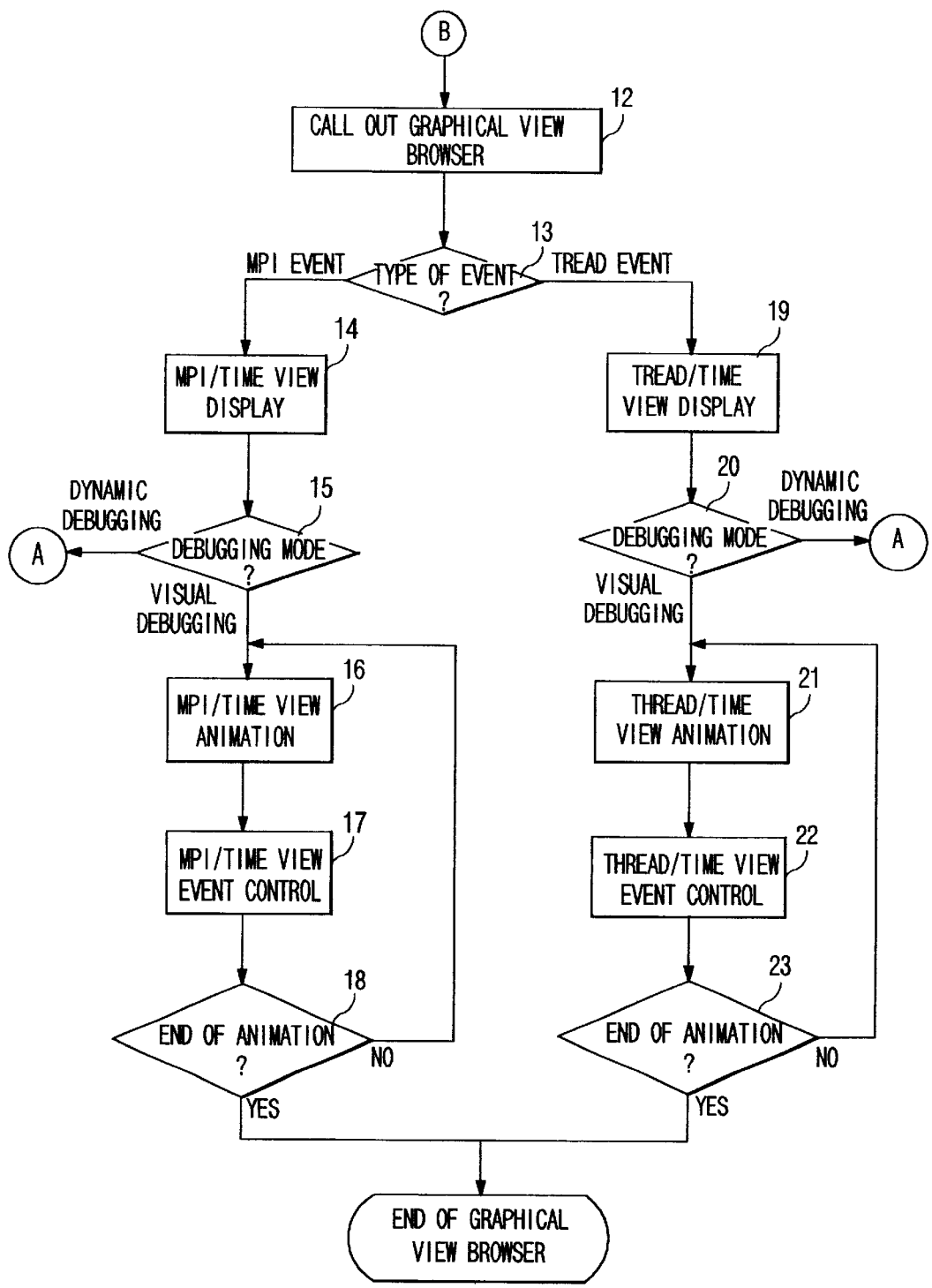

With reference to FIGS. 5a and 5b, the flow of the control by the integrated dynamic-visual parallel debugger and the textual/graphical view mapper is described below.

If the integrated dynamic-visual parallel debugger is called to a command prompt, the textual source view window is run and visualized on a screen (S1). The program to be debugged is called out from the file menu appearing at the above step through a source program creation dialog (S2). The events necessary for the program debugging, such as the breakpoint and watchpoint, are established (S3). The program is run until it hits the point of the debugging event (S4). At the point of the debugging event is examined information of the program execution, such as the execution states of the process and thread, symbol values of variables, and register values (S5). The procedure from S3 to S5 corresponds to the dynamic debugging. Whether to end the dynamic debugging or not is determined (S6). If the end of the debugging is determined, the execution of the parallel debugger completely ends. Otherwise, whether to continue the debugging or to use the textual/graphical view mapping is determined (S7). The use of the textual/graphical view mapping starts with the call of a mapping dialog (S8). The mapping object event, the unique number of the process running the event (the thread number in case of the threaded program), the number of times of calling out the event, and the desired graphical view window (an MPI/time view or a thread/time view) are set on the mapping dialog (S9). The execution log file created through the replay before calling out the parallel debugger is searched to find out the mapping object event (S10). If the mapping object event does not exist in the log file at a step S11, the procedure turns back to the step S9 to select a new mapping object event. If the mapping object event exists in the execution log file, the graphical view browser is called out (S12). The mapping object event is defined and the corresponding type of the graphical view is selected (S13). If the MPI/time view is selected, the MPI/time view is displayed (S14). The view display is run until the mapping object event is located at the center of the view. A debugging mode is selected (S15). In case where the dynamic debugging is continued, the procedure turns back to the step S3. In case where MPI/time view animation is used, the MPI/time view animation is performed (S16). The MPI/time view animation indicates to continue the view display of the step S14 based on the execution log file. The view control functions, such as play, pause, step, and stop, can be applied (S17). Whether to end the graphical view animation is determined (S18). If the end of the graphical view animation is determined, the execution of the graphical view browser ends. On the other hand, the visual debugging can be continued through iteration of the steps from S16 to S18. If the thread/time view is selected at the step S13, the thread/time view is displayed (S19). The view display is run until the mapping object event is located at the center of the view. Debugging mode is selected (S20). In case where the dynamic debugging is continued, the procedure turns back to the step S3. In case where thread/time view animation is used, the thread/time view animation is performed (S21). The thread/time view animation indicates to continue the view display of the step S19 based on the execution log file. The view control functions, such as play, pause, step, and stop, can be applied (S21). Whether to end the graphical view animation is determined (S22). If the end of the graphical view animation is determined, the execution of the graphical view browser ends. On the other hand, the visual debugging can be continued through iteration of the steps from S21 to S23.

Accordingly, the debugging method of the present invention has three effects. First, the present invention solves the non-deterministic execution problem of the parallel program, that is, the problem of the multiplicity of an execution path, and guarantees a deterministic execution path by storing in the log file, the execution path of the parallel program which is run at the SPAX, through the reference run of the program and visualizing the procedure. Second, this invention allows a user to easily operate the debugging of the parallel program without taking a special training on the new debugging method because it employs the dynamic debugging method which has been representatively used for debugging the program having the deterministic execution path, that is, the sequential program. Finally, by visualizing the result of the dynamic cyclical debugging in the graphical view pattern, which has been illustrated only in the textual view pattern before, this invention helps the user to easily recognize the execution of the parallel program and minimizes the required time for error tracing. This integrated dynamic-visual debugging environment suggests a new concept on program development environment which is especially proper to the development of complicated parallel programs of a large scale.

It will be apparent to those skilled in the art that various modifications and variations can be made in an integrated dynamic-visual parallel debugging apparatus and method of the present invention without deviating from the spirit or scope of the invention. Thus, it is intended that the present invention cover the modifications and variations of this invention provided they come within the scope of the appended claims and their equivalents.

What is claimed is:

1. An integrated dynamic-visual parallel debugging apparatus comprising:

replay drive means for receiving a program and creating program symbol table information and an execution log file through reference execution;

a parallel debugger core for receiving the program symbol table information and the execution log file from the replay drive means and managing views and events; and graphical user interface means for interfacing the parallel debugger core and a user.

2. The apparatus according to claim 1, wherein the replay drive means receives a multithreaded program or an message-passing interface (MPI) program.

3. The apparatus according to claim 1, wherein the replay drive means uses an event capture library to define an event to be captured.

4. The apparatus according to claim 1, wherein the replay drive means calls out and runs a thread rep lay module or an MPI replay module according to the program received.

5. The apparatus according to claim 1, wherein the replay drive means uses a replay library to make an original program follow an execution order identical to reference execution by referring the execution log file created during the reference execution.

6. The apparatus according to claim 1, wherein the parallel debugger core comprises:

a view manager for managing a window through which a result of debugging is displayed;

a controller for controlling execution of a program to be debugged; and an event manager for managing debugging events.

7. The apparatus according to claim 1, wherein the graphical user interface means comprises:

a source text view browser for displaying a result of debugging in a textual view pattern and providing a dialog and menu for supporting debugging events and control functions and a function of calling back functions corresponding to the menu and dialog;

a graphical view browser for supporting graphical views showing execution of a program being debugged and having control functions necessary for view animation; and a textual/graphical view mapper having a function of mapping events displayed in textual and graphical patterns.

8. An integrated dynamic-visual parallel debugging method comprising the steps of:

entering information for visual debugging while performing parallel dynamic cyclical debugging on a textual view window and requesting textual/graphical mapping;

notifying a result of searching an execution log file to find out a mapping object event to a graphical view browser and a dialog of which have been requested mapping;

displaying flow of execution of a program being debugged;

performing the visual debugging by repeatedly animating the execution flow of the program which is currently displayed;

examining an execution state at a point where the program stops because of a debugging event on various textual view windows regardless of progress of the visual debugging; and requesting textual/graphical view mapping in synchronization with the examining step above.

9. The method according to claim 8, wherein all the steps are repeatedly performed until a user terminates operation of a parallel debugger or finds an error.

10. The method according to claim 8, wherein the mapping object event in a textual/graphical view mapping dialog, a unique number of a process or a thread which executes the mapping object event, a total number of times that the mapping object event is executed before reaching an end point of the mapping, and a desired graphical view are entered at the step of requesting the textual/graphical mapping.

11. The method according to claim 8, wherein the step of displaying the execution flow comprises steps of:

initializing the graphical view browser according to notification of a fact that the mapping object event exists in the execution log file;

reading out of the execution log file before reaching a point where the mapping object event is located; and displaying the execution flow of the program being debugged on a selected graphical view window.

12. The method according to claim 8, wherein the visual debugging step is performed independently of dynamic debugging.

13. The method according to claim 8, wherein the execution flow of the program is read out of the execution log file consecutively from a point where the mapping object event is located and animated at the visual debugging step.

14. The method according to claim 8, wherein the visual debugging step uses a view control function.

15. The method according to claim 8, wherein the dynamic cyclical debugging is repeated on the textual view window displayed on a screen at the step of the examining the execution state.

* * * * *